United States Patent [19]
Kobori et al.

[11] Patent Number: 6,043,993
[45] Date of Patent: Mar. 28, 2000

[54] RESONANCE TYPE SWITCHING POWER SOURCE

[75] Inventors: Katsumi Kobori; Noritoshi Imamura, both of Miyagi, Japan

[73] Assignee: Sony Corporation, Japan

[21] Appl. No.: 09/283,232

[22] Filed: Apr. 1, 1999

[30] Foreign Application Priority Data

Apr. 10, 1998 [JP] Japan .................................. 10-099218
Jul. 21, 1998 [JP] Japan .................................. 10-204770

[51] Int. Cl.[7] .................................................. H02M 3/335
[52] U.S. Cl. .............................. 363/17; 363/25; 363/98; 363/134
[58] Field of Search .................................. 363/17, 24, 25, 363/40, 95, 98, 131, 132, 133, 134

[56] References Cited

U.S. PATENT DOCUMENTS

| | | | |
|---|---|---|---|
| 4,187,458 | 2/1980 | Milberger et al. | 363/25 |
| 4,631,652 | 12/1986 | Wendt | 363/16 |
| 4,796,173 | 1/1989 | Steigerwald | 363/25 |
| 5,151,852 | 9/1992 | Jacobson et al. | 363/131 |
| 5,159,541 | 10/1992 | Jain | 363/26 |
| 5,177,675 | 1/1993 | Archer | 363/25 |
| 5,729,444 | 3/1998 | Perol | 363/25 |

*Primary Examiner*—Peter S. Wong
*Assistant Examiner*—Bao Q. Vu
*Attorney, Agent, or Firm*—Rader, Fishman & Grauer; Ronald P. Kananen

[57] ABSTRACT

In a switching power source, by alternately turning on first and second MOS transistors, a switching current flows to a primary winding of a transformer, and an alternate current is transferred to a secondary side. The alternate voltage caused in a secondary winding is full-wave rectified by first and second diodes. Resonance elements (capacitor and coil) are connected to a tertiary winding coupled to an isolation transfer, thereby enabling the primary side to be set into a resonated state and to be set to a current resonance type switching power source. Since a leakage inductance of the transformer is not set to a resonance element, an interval between the windings of the isolation transformer can be closely coupled. Since a resonance current is not directly turned on/off, a peak value of the primary current is decreased and switching loss and loss due to an on-resistance can be decreased. The efficiency of a current resonance type switching power source is thus improved.

4 Claims, 3 Drawing Sheets

RESONANCE TYPE SWITCHING POWER SOURCE

BACKGROUND OF THE INVENTION

1. Field of the Invention

The present invention relates to a switching power source circuit, particularly, to a switching power source which is useful in case of reducing power loss in a current resonance type switching power source.

2. Description of Related Art

FIG. 4 shows a principle diagram of a switching power source circuit constructed by a half-bridge circuit. Reference symbols Q1 and Q2 denote switching elements composed of MOSFETs connected serially. A reference symbol T denotes an isolation transformer to transfer switching power on a primary side to a secondary side.

IC denotes a power source control circuit to alternately turn on/off the switching elements Q1 and Q2 and, normally, is constructed so as to enable a switching frequency of the switching elements Q1 and Q2 to be varied while comparing an output voltage V0 with a reference voltage by voltage detecting means (not shown) and controls so as to set the output voltage V0 to a constant voltage.

The output of the switching elements Q1 and Q2 is supplied to a primary winding L1 of the isolation transformer T and a resonance capacitor C1. If the switching elements Q1 and Q2 are alternately turned on/off, the primary winding L1 of the transformer is driven by a current charging/discharging the resonance capacitor C1 resonating to a leakage inductance of the transformer T.

If, at a timing when a current flowing to the switching elements is set to 0, a switching operation of the switching elements is executed by the resonance current, a loss current of the switching elements can be decreased.

Diodes D1 and D2 of full-wave rectification and a smoothing capacitor C0 are connected to the secondary winding L2 of the isolation transformer T and the DC output voltage V0 is obtained.

However, in such a switching power source circuit, a voltage V1 and a current I1 as shown in FIG. 5 are caused by turn on/off of the switching elements Q1 and Q2. At the time of turn-on of the switching element Q1, a current flowing to the transistor starts to flow from the minus direction at inclination determined by a resonance condition, and a zero-cross is realized. As for a current I, as shown in FIG. 5, a resonance current IR corresponding to a generated resonance circuit is multiplexed to a current I1 and has the same magnitude as the current I1 used to transfer power. Therefore, the peak current value is increased.

Thus, there is a problem in which a power loss of the product of a saturation voltage and the current at the switching elements Q1 and Q2 is increased.

Particularly, with respect to the conventional current resonance type switching power source, a leakage inductance of the isolation transformer T is used so as to generate a resonance current and a resonance frequency is set by the leakage inductance and the resonance capacitor C1, so that it is difficult to design the isolation transformer T. Additionally, to generate a leakage magnetic flux to the isolation transformer T, for instance, it is designed so that the primary winding L1 and the secondary winding L2 are loosely coupled. Therefore, there arises a problem in which conversion efficiency of a power is lowered and a leakage magnetic field is caused.

SUMMARY OF THE INVENTION

According to the invention, in order to solve the problems, in a switching power source circuit for switching a power supply voltage at a predetermined switching frequency and for outputting an AC power caused by the switching operation via the transformer, a third winding comprising resonance elements which resonate at a predetermined frequency is provided for a winding of the transformer and a resonance frequency of the switching power source is decided by the resonance elements.

In case of a half-bridge type switching power source, normally, the transformer comprises a primary winding and a secondary winding, and a third winding is set to a tertiary winding. By connecting resonance elements to the tertiary winding, a switching power source of a current resonance type is constructed.

Since the current resonance circuit is added to the third winding of the transformer and the resonance frequency of the switching power source is set to a specific value, a resonance current is not directly turned on/off by the switching elements, switching loss can be reduced.

In case of the isolation transformer, the primary winding and secondary winding can be closely coupled, so that a conversion efficiency of power to be transmitted can be improved, as compared with that of the conventional current resonance type switching power source.

Further, corresponding to a ratio of the number of windings, a voltage to be applied of the resonance circuit can be arbitrarily set and the optimum design of the resonance circuit, including realization of small loss, can be executed.

DETAILED DESCRIPTION OF THE PREFERRED EMBODIMENTS

Figure 1:
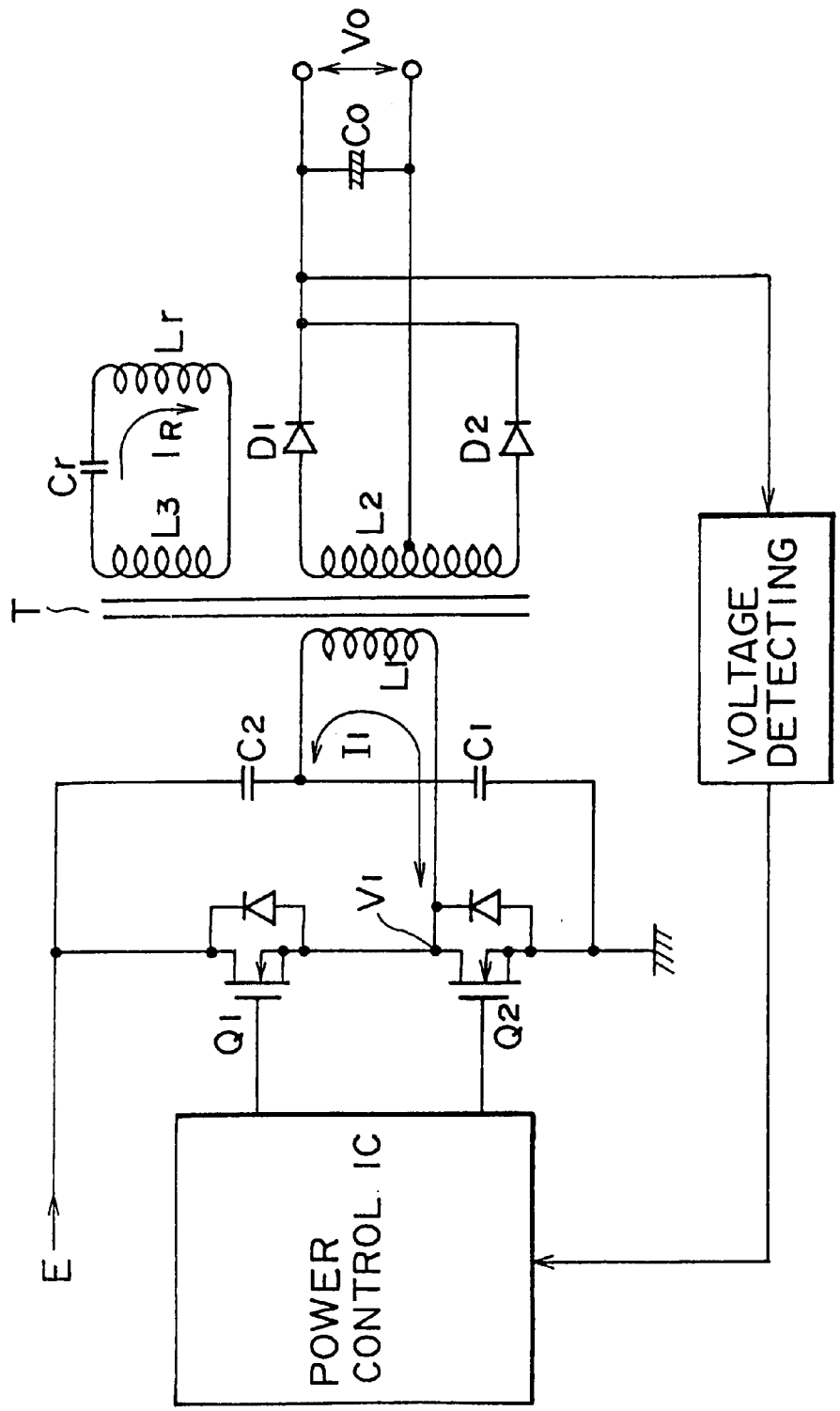
FIG. 1 is a circuit diagram for showing an embodiment of a switching power source circuit of the invention.

FIG. 1 shows a current resonance type switching power source circuit of a half-bridge type which shows an embodiment of the invention. As shown in FIG. 1, a reference symbol E denotes a supply power source and Q1 and Q2 denote switching elements forming a switching circuit of the half-bridge connection. Those are constructed by MOS transistors.

The output is connected to the middle point between two capacitors C1 and C2 for commutation for having a half-bridge construction via the primary winding L1 of the isolation transformer T.

A full-wave rectifying circuit is constructed so that an induction voltage induced by the secondary winding L2 of the isolation transformer T charges a smoothing capacitor C0 via diodes D1 and D2.

Moreover, in the embodiment of the invention, as a third winding, a tertiary winding L3 is provided for the isolation transformer T. A capacitor Cr for resonance and a coil Lr for resonance are connected to the tertiary winding L3 and the resonance circuit is added.

Figure 3:
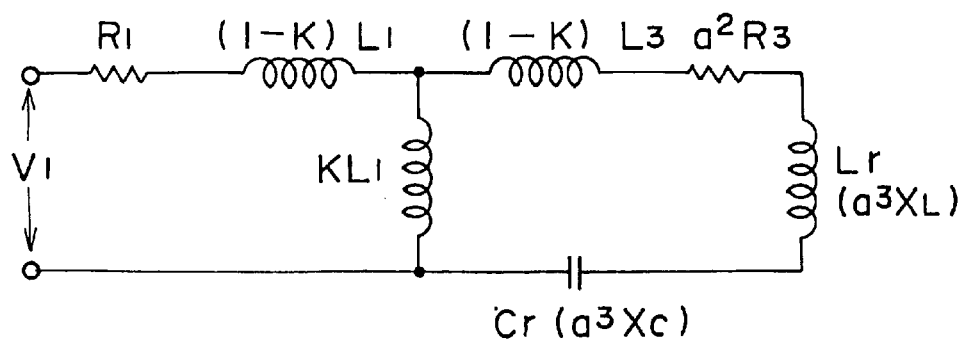
FIG. 3 is a circuit diagram equivalent to a resonance impedance provided for a tertiary winding.
Figure 4:
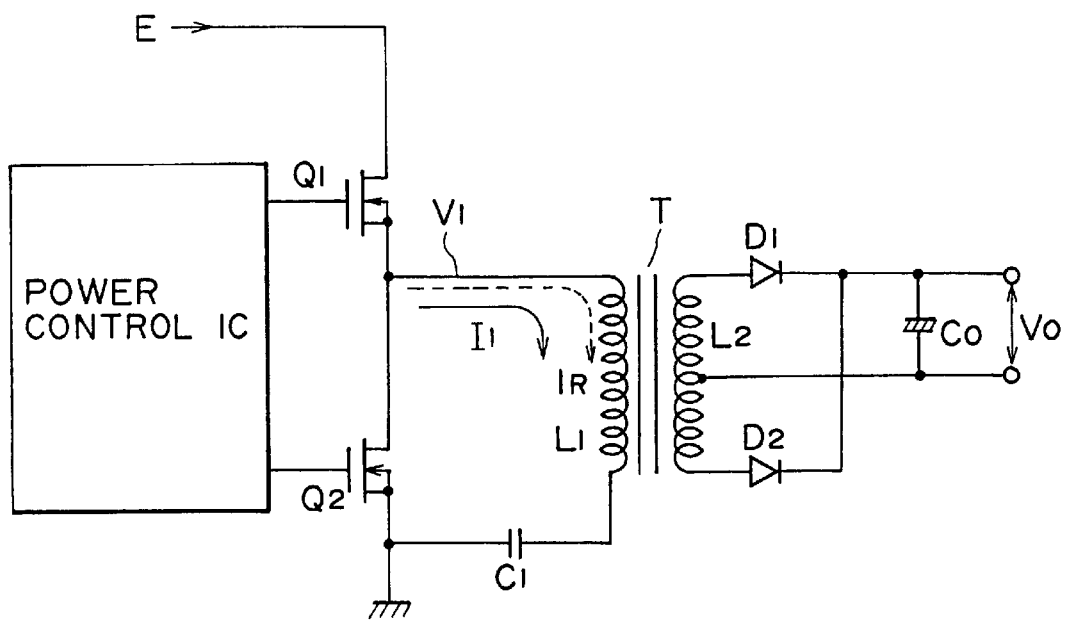
FIG. 4 is a circuit diagram for showing an outline of a current resonance type switching power source.
Figure 5:
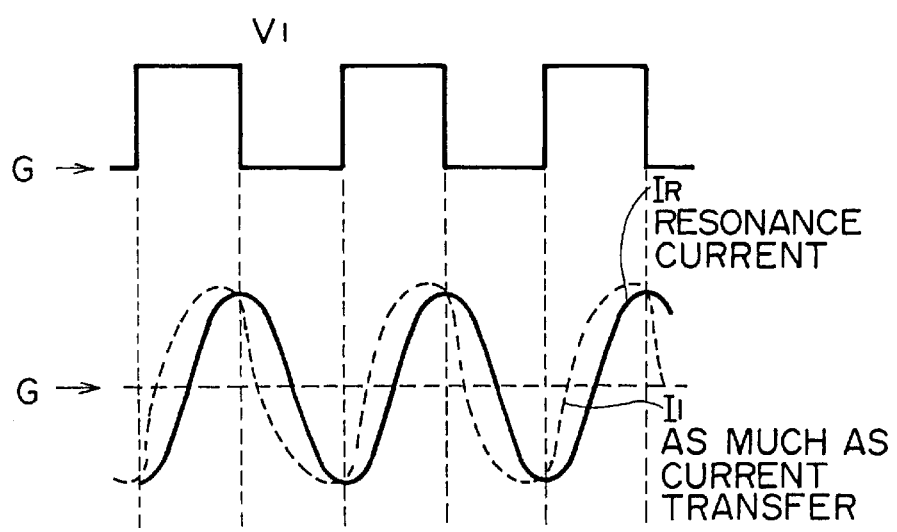
FIG. 5 is a waveform diagram of a switching voltage and a resonance current.

That is, the resonance elements (Cr, Lr) coupled to the tertiary winding L3, as shown in FIG. 3, are, equivalently, connected the switching circuit on the primary side via the isolation transformer T through a winding ratio of N1/N3=a.

In this case, R1 and (1-k)L1 denote a resistance component of the primary winding and a leakage inductance component, respectively. A reference symbol K denotes a coupling coefficient of the primary and tertiary windings.

If it is assumed that K=1 by a close coupling, in case where a winding ratio is equal to "a", the impedance of the resonance elements Cr and Lr is equal to a value obtained by being multiplied by $a^2$.

A resonance frequency set by the impedance of the equivalent resonance elements induces a current IR, serving as a resonance waveform when the switching elements Q1 and Q2 are turned on/off, to the tertiary winding L3.

IC is an IC circuit for control over driving the switching elements Q1 and Q2. The IC circuit normally controls a switching frequency so as to maintain the output voltage V0 to a constant voltage and detects an irregular increase in temperature of the switching power source, so that it can have a protecting function for stopping a switching operation.

An operation of a switching power source of the invention will now be described hereinbelow.

Figure 2:
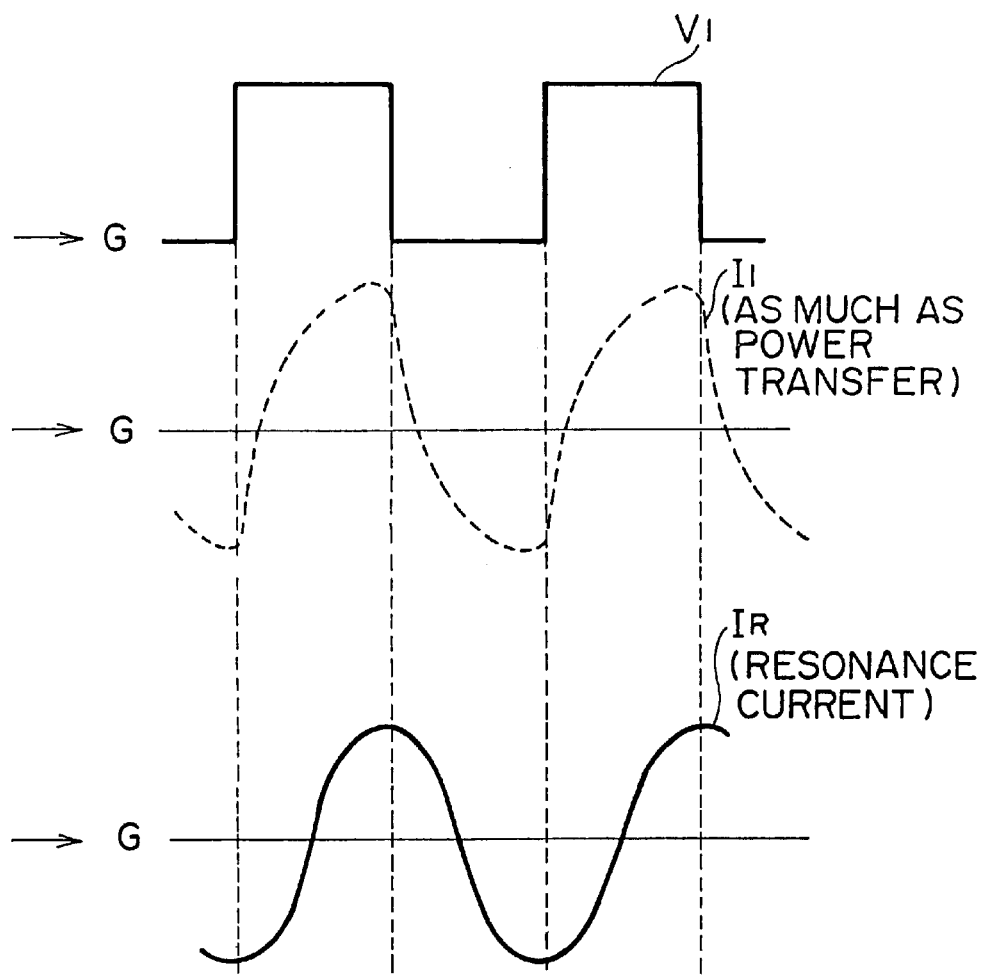
FIG. 2 is a waveform diagram for showing a signal at each portion at the time of a switching operation in FIG. 1.

For example, if the MOS transistor Q1 is driven to be turned on and the MOS transistor Q2 is driven to be turned off, the voltage V1 is applied and its current flows from the power source E to the commutation capacitor C1 via the MOS transistor Q1 and the primary winding L1 of the transformer. The commutation capacitor C1 is charged and, at the same time, the current I1 as shown in FIG. 2 is flowed to the primary winding L1 of the transformer.

Subsequently, corresponding to the resonance frequency, the MOS transistor Q1 is driven to be turned off and the MOS transistor Q2 is driven to be turned on, so that the voltage V1 is equal to a saturation voltage of the transistor. The current I1 in the reverse direction is supplied to the primary winding L1 of the isolation transformer T via the commutation capacitor C2 and the primary winding L1 of the transformer. The alternate voltage is induced to the secondary winding L2.

If the duty cycle of the switching frequency is equal to 50%, the commutation capacitors C1 and C2 are charged at a half of the power supply voltage as a stationary state, respectively.

Although the alternate voltage applied to the isolation transformer T is induced, even to the tertiary winding L3, the tertiary winding is formed so as to generate a serial resonance by the resonance elements (Lr, Cr). Therefore, as shown by the current waveform IR in FIG. 2, the waveform of the drive current I on the primary side also becomes the resonance waveform by the influence of the resonance elements.

That is, by the equivalent circuit between the primary winding in the isolation transformer and the tertiary winding as shown in FIG. 3, it is equivalent that an impedance obtained by multiplying the resonance impedance of the impedance $\omega L1/\omega C$ of the resonance elements by the winding ratio $a^2$ is inserted to the circuit on the primary side. Similarly with the conventional current resonance type circuit, a switching frequency is properly determined, thereby enabling switching loss to be reduced upon turn-on and turn-off.

In the case of the invention, at the time of turn-on of the MOS transistor as well, the resonance current component is not directly turned on/off by the switching elements, so that loss due to an on-resistance of the FET can be reduced.

Since the resonance frequency is not set by using the leakage inductance of the transformer, the windings are provided so that a coupling of the primary, secondary, and tertiary windings can be set to a close coupling as much as possible. The isolation transformer can be easily designed and, particularly, a transfer efficiency of a power for the secondary winding can be set to be high.

When the tertiary winding L3 is designed so that it is a little loosely coupled to the primary winding L1, a leakage flux is occurs only between the primary and tertiary windings. The leakage flux is used as a leakage inductance, so that the resonance coil Lr in FIG. 1 can be omitted and a resonance frequency can be set with the capacitor Cr.

In the above embodiment, the current resonance type converter of the half-bridge type has been described as an example. However, with regard to a resonance type power converting apparatus for turning on/off a current passing through the windings of the transformer, causing an alternate voltage by the switching operation, and turning on/off the switching current by using the resonance waveform, as will be obviously understood, the invention can be also applied to a resonance type power converting apparatus of another system for forming the resonance type switching power source by providing a winding to connect only the resonance circuit.

As mentioned above, the invention has an effect such that in a power converting apparatus in which a resonance type converter is formed by using a leakage inductance of the transformer, a third winding for forming only a resonate circuit to resonance at a predetermined resonate frequency is provided for the transformer, so that switching loss when a resonance current is switched can be eliminated and an efficiency of the converting apparatus can be increased.

Particularly, in case of the power converting apparatus of the insulation type, since the primary and secondary windings can be closely coupled, the transformer can be easily designed and transfer efficiency of a current can be improved.

What is claimed is:

1. A resonance type switching power source, comprising:
   a transformer having a primary winding and a secondary winding;
   switching elements for performing a switching operation to turn on/off a power supply voltage at a predetermined switching frequency and for outputting electric power caused by said switching operation via said transformer;
   a tertiary winding coupled to said transformer; and
   a resonance coil and a resonance capacitor that resonate at a predetermined frequency, wherein said resonance coil and resonance capacitor are connected to said tertiary winding in series to form a resonance circuit that determines a number of windings in said transformer and sets a resonance frequency of the switching power source to the predetermined frequency.

2. A resonance type switching power source according to claim 1, wherein said switching elements comprise two MOS transistors which are half-bridge connected.

3. A resonance type switching power source according to claim 1, wherein said primary winding and secondary winding are closely coupled.

4. A resonance type switching power source according to claim 1, wherein said tertiary winding and said primary winding are loosely coupled and wherein the resonance frequency is set by the resonance capacitor and a leakage inductance between the primary winding and the tertiary winding.

* * * * *